US005774491A

United States Patent [19]

Kimura et al.

[11] Patent Number: 5,774,491

[45] Date of Patent: Jun. 30, 1998

[54] ENERGY EXCHANGE BETWEEN A LASER BEAM AND CHARGED PARTICLES USING INVERSE DIFFRACTION RADIATION AND METHOD FOR ITS USE

[75] Inventors: Wayne D. Kimura, Bellevue; Richard D. Romea, Seattle; Loren C. Steinhauer, Bothell, all of Wash.

[73] Assignee: STI Optronics, Inc., Bellevue, Wash.

[21] Appl. No.: 675,999

[22] Filed: Jul. 9, 1996

[51] Int. Cl.$^6$ .......................................... H01S 3/08

[52] U.S. Cl. .............................. 372/98; 372/27; 372/73; 372/103

[58] Field of Search .............................. 372/99, 102, 98, 372/69, 73, 27, 103

[56] References Cited

U.S. PATENT DOCUMENTS 4,414,671 11/1983 Wells, Jr. et al. .......................... 372/73

4,466,101 8/1984 Schoen .................................... 372/73

*Primary Examiner*—Leon Scott, Jr.

*Attorney, Agent, or Firm*—Robert M. Storwick

[57] ABSTRACT

A method and apparatus for exchanging energy between relativistic charged particles and laser radiation using inverse diffraction radiation or inverse transition radiation. The beam of laser light is directed onto a particle beam by means of two optical elements which have apertures or foils through which the particle beam passes. The two apertures or foils are spaced by a predetermined distance of separation and the angle of interaction between the laser beam and the particle beam is set at a specific angle. The separation and angle are a function of the wavelength of the laser light and the relativistic energy of the particle beam. In a diffraction embodiment, the interaction between the laser and particle beams is determined by the diffraction effect due to the apertures in the optical elements. In a transition embodiment, the interaction between the laser and particle beams is determined by the transition effect due to pieces of foil placed in the particle beam path.

31 Claims, 3 Drawing Sheets

ENERGY EXCHANGE BETWEEN A LASER BEAM AND CHARGED PARTICLES USING INVERSE DIFFRACTION RADIATION AND METHOD FOR ITS USE

TECHNICAL FIELD

The present invention relates to methods and apparatus for exchanging energy between relativistic charged particles and laser radiation using inverse diffraction radiation.

BACKGROUND OF THE INVENTION

Transition radiation (TR) emitted by charged particles passing suddenly between two media with different indices of refraction (e.g., a thin foil and vacuum) is a well-known phenomenon. Diffraction radiation (DR) is similar to TR except the particles pass through a small aperture. The fields emanating from a relativistic particle diffract as the particle passes through the aperture, thereby generating DR. In the limit as the aperture size goes to zero, the DR characteristics become identical to TR. By analogy with other laser acceleration schemes, such as inverse free electron laser and inverse Cerenkov acceleration (see below), this invention claims it is possible to exchange energy between charged particles and an external optical field (i.e., laser beam) using the inverse process for TR or DR. This, then, forms the basis for this invention.

The term "exchanging energy" means that energy from the optical field can be transferred to the particles or that energy from the particles can be transferred to the optical field, and simultaneously the particle trajectory can be changed. Which of these transferals occurs depends upon the phase of the optical field relative to the particles. If the electric field vector component of the optical field, which is collinear with the particle motion, points in the same direction as the particle motion (termed an "accelerating" field), then the particles will gain energy and be accelerated. If the electric field vector component of the optical field, which is collinear with the particle motion, points in the opposite direction of the particle motion (termed a "decelerating" field), then the particles will lose energy and be decelerated. Additionally, if the electric field vector component of the optical field, which is perpendicular to the particle motion, points towards the axis defined by the particle motion (termed a "focusing" field), then the particle trajectory will curve towards the axis resulting in focusing of the particle beam. If the electric field vector component of the optical field, which is perpendicular with the particle motion, points away from the axis defined by the particle motion (termed a "defocusing" field), then the particle trajectory will curve away from the axis resulting in defocusing of the particle beam.

Hence, one particular application of this invention is to accelerate relativistic particles, such as electrons, using a laser beam. A number of different schemes for accelerating electrons have been devised and some have been experimentally demonstrated. Each scheme relies on a particular physical effect and a particular geometry and/or medium to enable this acceleration. For example, an inverse free electron laser (IFEL) uses a periodic magnetic field; a plasma beat wave accelerator (PBWA) uses a plasma; a grating accelerator uses a periodic structure, operates in the near-field, and relies on evanescent waves; and an inverse Cerenkov accelerator (ICA) uses a gas.

Each of these schemes have certain disadvantages that are related to the particular physical effect being utilized. For example, the IFEL is limited in energy gain due to synchrotron losses caused by the curved trajectory the electrons follow when traversing through the periodic magnetic field. The PBWA requires the formation of uniform, controlled plasmas that can be difficult to obtain. The grating accelerator requires very low emittance electron beams (e-beams) and accurate e-beam position control in order to focus the e-beam within an optical wavelength of the grating because it uses the evanescent fields emanating from the grating surface, and it requires a durable periodic structure that can withstand the intense laser beam. ICA suffers from electron scattering off the gas molecules, which degrades the overall process and increases the emittance of the e-beam.

This invention does not have these same kind of limitations and, therefore, may provide a better way to accelerate particles. An inverse diffraction accelerator (IDA) or inverse transition accelerator (ITA) would have advantages over other laser acceleration schemes because it eliminates the need for plasmas or phase-matching media, is not limited by synchrotron losses, and does not require operating within distances of only an optical wavelength since it operates in the far-field and does on rely on evanescent fields.

Comparing IDA to ITA, IDA has the advantage of enabling energy exchange without disrupting the particle beam due to scattering from a medium, such as a thin foil, but the presence of the hole tends to lower the amount of energy exchange compared to ITA. ITA has the advantage of providing the highest energy gain of the two, but the presence of the thin foil that the particle beam must traverse through can degrade the beam properties (e.g., emittance).

SUMMARY OF THE INVENTION

According to one aspect, the invention is a method and apparatus for exchanging energy between a relativistic particle beam and a laser beam. The particle beam contains one or more charged particles.

According to a first aspect, the invention is a method for exchanging energy between a relativistic particle beam and a laser beam, the exchange of energy occurring due to inverse diffraction radiation. The relativistic particle beam contains one or more charged particles. The method includes the steps of a) supplying a first optical element having an aperture, b) supplying a second optical element having an aperture, and c) positioning the first and second optical elements so that the relativistic particle beam passes through the aperture in the first optical element and then through the aperture in the second optical element. The apertures of the first and second optical elements are separated by a predetermined distance of separation, L.

The method also includes the steps of d) causing the laser beam to interact with the first element so that the laser beam intersects the particle beam at a predetermined angle, $\theta_1$, and e) causing the laser beam to interact with the second element after interacting with the particle beam.

According to a second aspect, the invention is an apparatus for exchanging energy between a relativistic particle beam containing one or more charged particles and a laser beam. The exchange of energy occurs due to inverse diffraction radiation. The apparatus includes a first optical element having an aperture and a second optical element having an aperture. The apertures of the first and second optical elements are separated by a predetermined distance of separation, L, and are positioned so that the relativistic particle beam passes through the aperture in the first optical element and then through the aperture in the second optical element. The laser beam interacts with the first element so that the laser beam intersects the particle beam at a predetermined angle, $\theta_1$. The laser beam interacts with the second element after interacting with the particle beam.

For all aspects of the present invention, the distance of separation L between the apertures, optical elements (including tube openings), or foils is of order $\lambda/(\theta_1^2+\gamma^{-2})$, where $\lambda$ is the laser wavelength, $\theta_1$ is the angle of intersection between the laser beam and the particle beam, and $\gamma$ is the relativistic energy factor equal to the total energy of the particle beam divided by the rest mass energy of the particle.

Also, for all aspects of the present invention, the angle of intersection $\theta_1$ between the laser beam and particle beam is of order $[(2n+1)\lambda/L]^{1/2}$, where n is an integer. Highest acceleration occurs when n=0.

Further, for all aspects of the present invention, a stage is defined as comprising the first optical element, tube, or foil, the second optical element, tube, or foil, the separation distance, and the intersection angle between the laser beam and the particle beam. Hence, for all aspects, the method and apparatus of the present invention further includes multiple stages positioned in tandem with the particle beam traversing through each stage. For all aspects, the method further includes reusing the laser beam between stages by redirecting the laser beam leaving a stage and sending it into the succeeding stage. Phase adjustment of the laser beam relative to the particle beam is provided using appropriate optical apparatus disposed along the laser beam path between stages.

In accordance with the summarized method of the invention, the first and second apertures of the optical elements are the sources for forward diffraction radiation and backward diffraction radiation, respectively. The separation distance L between the apertures or ends of tubes is of order the formation length for generation of diffraction radiation. Optimum energy exchange occurs when $L\sim\lambda/(\theta_1^2+\gamma^{-2})$ and the amount of energy exchange decreases if $L>\lambda/(\theta_1^2+\gamma^{-2})$ . For a given particle beam energy and separation distance, the diffraction radiation is emitted with a characteristic angular dependence for each wavelength. Peaks in the emission occur when the angle of intersection $\theta_1$ between the laser beam and particle beam is of order $[(2n+1)\lambda/L]^{1/2}$, where n is an integer. The highest peak is when n=0. In IDA or ITA, a laser beam at wavelength $\lambda$ intersects the particle beam at angle $\theta_1$ within distance L. Optimum energy exchange occurs when the polarization of the laser beam matches the diffraction radiation, where the former depends upon the shape of the aperture or end of the tube. For a circular aperture, the polarization of the diffraction radiation is radial; therefore, the optimum laser beam polarization is a radial one. For IDA the amount of energy exchange also tends to decrease from the ITA case as the aperture size increases. Approximately 80% of the energy exchange possible with ITA is achievable with IDA if the radius $r_a$ of the apertures is approximately $\lambda/2\ \pi\theta_1$.

Although schemes similar to inverse diffraction radiation have been reported in the literature [R. H. Pantell and M. A. Piestrup, Appl. Phys. Lett. 32(11), 781 (1978); M. O. Scully, Appl. Phys. B 51, 238 (1990); A. A. Varfolomeev and A. H. Hairetdinov, in Advanced Accelerator Concepts, AIP Conference Proceedings, No. 279, J. S. Wurtele, Ed., (American Institute of Physics, New York, 1993), p. 319]; it is important to note that none of the authors made the critical identification that the phenomenon is related to inverse diffraction radiation. Consequently, none of the references above state or suggest the importance of limiting the interaction length to of order of the formation length for diffraction radiation. Neither do the references state or suggest the importance of the aperture size and its effect on the amount of energy exchange. Further, none of the references state or suggest that the angle of intersection between the laser beam and particle beam is not arbitrary and depends upon the laser wavelength and the formation length.

DETAILED DESCRIPTION OF THE PREFERRED EMBODIMENT OF THE INVENTION

The purpose of the inventive method and apparatus is to provide a means to exchange energy between relativistic charged particles and laser light. Such energy exchange can be used to modulate the energy of the particle beam, thereby permitting prebunching of the particles, or for a particle beam that is already prebunched at the laser wavelength the energy exchange can result in net acceleration or deceleration. If deceleration occurs, then the particle beam will generate enhanced optical radiation when traversing through the apparatus. Hence, another application of this invention is as a new source of optical radiation.

Figure 1:
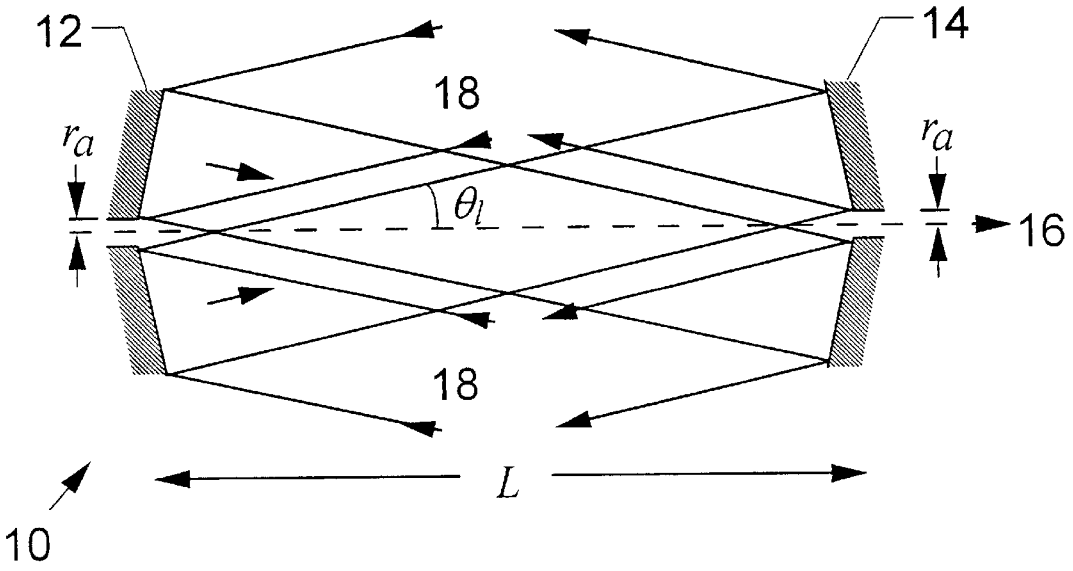
FIG. 1 is a schematic diagram of a preferred embodiment of the invention.

FIG. 1 is a schematic diagram of a preferred embodiment of the invention. The inventive apparatus is denoted in general by the numeral 10. FIG. 1 also shows a charged particle beam 16. The charged particle beam 16 is typically composed, for example, of electrons, protons, or ions. The preferred embodiment of the apparatus 10 includes a first optical element 12, consisting of one or more optical components, with a small aperture of radius $r_a$ and separated by a distance L from a second optical element 14, consisting of one or more optical components, also with a small aperture of radius $r_a$, with the particle beam 16 traveling through the center of these apertures from the first element to the second element. Typically, the particle beam will be traveling through a vacuum between the two apertures. In FIG. 1, the optical elements are cylindrically symmetric about the axis defined by the particle beam trajectory. An annular-shaped laser beam 18 is directed upon the first optical element 12 and reflected onto the particle beam 16. As an example, the first optical element 12 as depicted in FIG. 1 is a concave axicon mirror which results in the laser beam 18 being focused as a line focus through which the particle beam 16 passes. The angle of intersection between the laser beam 18 and the particle beam 16 is shown in FIG. 1 as $\theta_1$. Alternative designs for the first optical element 14 include having a spherical focusing profile and using transmissive optics rather than reflective optics.

After crossing the particle beam path, the laser reflects off the second optical element 14. As an example, the second optical element 14 as depicted in FIG. 1 is a concave axicon mirror which converts the laser beam 18 back into a collimated annulus. This makes it easier to reuse the laser beam in subsequent stages (see below). Alternative designs for the second optical element 14 include being a flat mirror inclined at an angle with respect to the particle beam trajectory, which reflects the laser beam away from the particle beam, with the mirror having an aperture oriented parallel to the particle beam trajectory to permit the particle beam to pass through the mirror, having a spherical focusing profile, and using transmissive optics rather than reflective optics.

Figure 2:
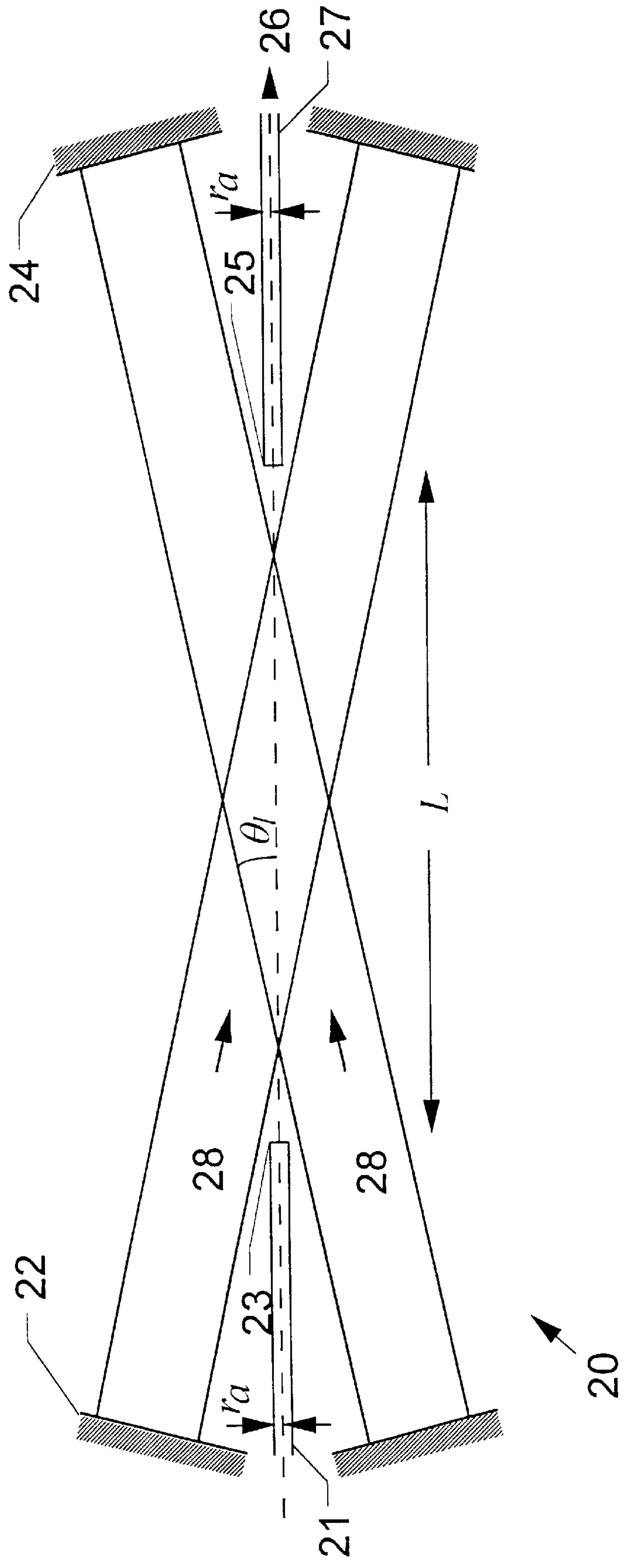
FIG. 2 is a schematic diagram of a second preferred embodiment of the present invention.

FIG. 2 is a schematic diagram of a second preferred embodiment of the present invention. This second embodiment is denoted in general by the numeral 20. The particle beam 26 travels through the center of a hollow tube 21 and leaves the end of the tube 23 to enter an evacuated region where the laser beam 28 intersects the particle beam within an interaction region. The end of the tube 23 is an open aperture for the case of IDA or the end is covered with a thin foil for the case of ITA. Separated a distance L from the end 23 of the first tube 21 is the entrance 25 of a second hollow tube 27, which the particle beam 26 enters after interacting with the laser beam 28. The radius of the tube opening at end 23 and entrance 25 is denoted by $r_a$. Note that, although the diameters of tubes 21 and 27 are depicted in FIG. 2 as having the same diameters as end 23 and entrance 25, the diameters of tubes 21 and 27 can be different in size from these openings as long as the walls of the tube do not obstruct the laser beam 28. For example, the tubes can have a conical taper with a half-apex angle of $\theta_1$ where the tip of the cone has an opening of radius $r_a$. Typically, there is a vacuum within the tubes and within the interaction region.

An annular-shaped laser beam (not shown) is directed upon the first optical element 22, consisting of one or more optical components, and reflects onto the particle beam 26 at an angle $\theta_1$. In FIG. 2, the optical elements are cylindrically symmetric about the axis defined by the particle beam trajectory. As an example, the first optical element 22 as depicted in FIG. 2 is a concave axicon mirror which results in the laser beam 28 being focused as a line focus through which the particle beam 26 passes. As another example, the second optical element 24 as depicted in FIG. 2 is a concave axicon mirror that recollimates the laser beam 28 after leaving the interaction region. This may be helpful when reusing the laser beam in subsequent stages (see below). Alternative designs for the first 22 and the second 24 optical elements include having a spherical focusing profile and using transmissive optics rather than reflective optics.

Note that in contrast to embodiment 10 (see FIG. 1), the first 22 and second 24 optical elements are not necessarily physically a part of or connected to the tubes 21 or 27 or the apertures or foils 23 and 25. Hence, one of the advantages of embodiment 20 is that the optical surface of the optical elements 22 and 24 can be positioned farther away from the laser beam/particle beam interaction region. This increases the area of illumination on the optical surface, thereby reducing the laser power or energy density on the optical surface and improving its laser damage resistance.

Figure 3:
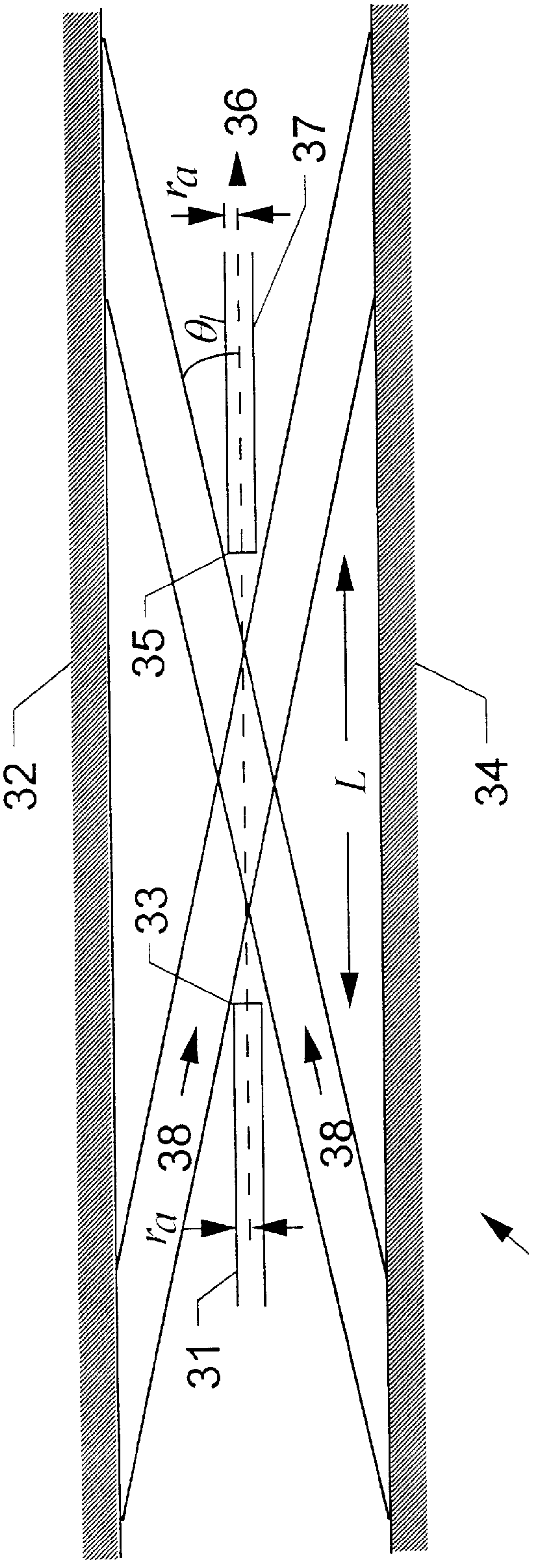
FIG. 3 is a schematic diagram of a third preferred embodiment of the inventive device.

FIG. 3 is a schematic diagram of a third preferred embodiment of the present invention. This third embodiment is denoted in general by the numeral 30. The particle beam 36 travels through the center of a hollow tube 31 and leaves the end of the tube 33 to enter an evacuated region where the laser beam 38 intersects the particle beam within an interaction region. The end of the tube 33 is an open aperture for the case of IDA or the end is covered with a thin foil for the case of ITA. Separated a distance L from the end 33 of the first tube 31 is the entrance 35 of a second hollow tube 37, which the particle beam 36 enters after interacting with the laser beam 38. The radius of the tube opening at end 33 and entrance 35 is denoted by $r_a$. Note that, although the diameters of tubes 31 and 37 are depicted in FIG. 3 as having the same diameters as end 33 and entrance 35, the diameters of tubes 31 and 37 can be different in size from these openings as long as the walls of the tube do not obstruct the laser beam 38. For example, the tubes can have a conical taper with a half-apex angle of $\theta_1$ where the tip of the cone has an opening of radius $r_a$. Typically, there is a vacuum within the tubes and within the interaction region.

A reflective optical tube 32, 34 with an optical quality interior surface surrounds the tubes 31, 36 such that the laser beam 38 reflects off the interior surface of the tube 32, 34 and onto the particle beam 36 at an angle $\theta_1$. In this mode of operation the tube 32, 34 functions the same as an axicon mirror. The tube 32, 34 has the advantage of automatically redirecting the laser beam 38, after interacting with the particle beam, to subsequent laser beam/particle beam interaction regions positioned immediately downstream from the one depicted in FIG. 3. This is helpful when implementing multiple stages of acceleration, as described below.

Alternative designs for the tube 32, 34 include a tube cut longitudinally in half such that the top half-tube 32 and the bottom half-tube 34 are separated by a small gap. This permits a means for supporting the tubes 31 and 36 using support struts that extend through the gap between the half-tubes 32 and 34. Splitting the tube 32, 34 into two half-tubes may also facilitate polishing of the interior walls in order to obtain the required optical finish. To avoid striking the struts, the laser beam profile would be designed to cause laser light to reflect only off the top and bottom half-tubes.

Alternative optical finishes and materials for the interior of the tube 32, 34 include metal and dielectric coatings, and materials whose index of refraction is less than unity at the wavelength of the laser, thereby permitting total internal reflection to occur. An example of the material is sapphire ($Al_2O_3$) at 10.6 $\mu$m.

For all embodiments, to obtain significant energy exchange the following constraints apply. 1) The interaction length L must be of order the formation length for diffraction or transition radiation given by $\lambda/(\theta_1^2+\gamma^{-2})$, where $\lambda$ is the laser wavelength, $\theta_1$ is the angle of intersection between the laser beam and the particle beam, and $\gamma$ is the relativistic energy factor equal to the total energy of the particle beam divided by the rest mass energy of the particle. 2) Optimum energy exchange occurs when the interaction angle $\theta_1$ of the laser beam with respect to the particle beam is of order $[(2n+1)\lambda/L]^{1/2}$, where n is an integer. Peak energy exchange occurs when n =0. And, 3) the radius $r_a$ of the apertures is of order $\lambda/2\pi\theta_1$. (Note that only the first two constraints apply to inverse transition acceleration.)

Each embodiment shown in FIGS. 1, 2, and 3 also defines a single acceleration stage. Hence, multiple stages of acceleration occurs by positioning stages in tandem with the particle beam traversing through each stage. At each stage a new laser beam can be introduced or the laser beam can be reused by redirecting the laser beam, after leaving the interaction region, towards the beginning of the succeeding stage. The recollimated laser beams in embodiments 10 and 20 help facilitate this process. Embodiment 30 automatically redirects the laser beam into succeeding stages.

To help compensate for divergence of the laser beam, the second optical elements 14 and 24 in embodiments 10 and 20, respectively, can have appropriate curvatures. Similarly, the walls of tube 32, 34 in embodiment 30 can be curved at the positions where the laser beam 38 reflects off the wall to help compensate for divergence of the laser beam.

There are several schemes possible for redirecting the laser beam after traveling through one stage towards a subsequent stage. For example, if the geometry shown in FIG. 1 is used, then a mirror can be positioned within the interaction region to intercept the spent laser beam reflecting off the second axicon 14. This mirror would be oriented at an angle (e.g., 45°) with respect to the axis defined by the particle beam trajectory and have large central aperture that permits unobstructed transmission of the axicon-focused laser beam within the interaction region. The spent laser beam reflecting off this mirror is then sent to other mirrors that direct it to the next acceleration stage. As mentioned earlier, the reflecting tube 32, 34 in FIG. 3 incorporates the axicon focusing and automatic redirecting of the spent laser to the next stage all within the same optical element.

Between stages, the reused laser beam travels through an optical apparatus that adjusts the phase of the reused laser beam relative to the particle beam in order to maintain optimum energy exchange. Examples of the apparatus include phase retardation plates and mirrors whose position can be adjusted using devices such as piezoelectric-driven positioners. The latter example applies to embodiment 30 where the separation distance between half-tubes 32 and 34 is adjustable.

While the foregoing is a detailed description of the preferred embodiments of the invention, there are many alternative embodiments of the invention that would occur to those skilled in the art and which are within the scope of the present invention. Accordingly, the present invention is to be determined by the following claims.

We claim:

1. A method for exchanging energy between a relativistic particle beam, containing one or more charged particles, and a laser beam, the exchange of energy occurring due to inverse diffraction radiation, the method comprising the steps of:

a) supplying a first optical element having an aperture;

b) supplying a second optical element having an aperture;

c) positioning the first and second optical elements so that the relativistic particle beam passes through the aperture in the first optical element and then through the aperture in the second optical element, the apertures of the first and second optical elements being separated by a predetermined distance of separation, L;

d) causing said laser beam to interact with said first element so that said laser beam intersects the particle beam at a predetermined angle, $\theta_1$, between the first and second elements;

e) causing energy to exchange between said laser beam and the particle beam, wherein a net exchange of energy occurs because the interaction region is limited by the first and second optical elements, to produce inverse diffraction radiation; and causing the laser beam to interact with said second element after interacting with said particle beam.

2. The method of claim 1 wherein the first optical element has optical components that include reflective and transmissive optics, at least some of the optical components having profiles that focus the laser beam onto the particle beam.

3. The method of claim 2, wherein the profiles include a concave axicon profile and said first aperture lies in the center of an optical component having a concave axicon profile.

4. The method of claim 2, wherein the profiles include a concave spherical profile and said first aperture lies in the center of an optical component having a spherical component.

5. The method of claim 1 wherein the second optical element has optical components that include reflective and transmissive optics, at least some of the optical components having profiles that direct the laser beam away from the particle beam after intersecting the particle beam.

6. The method of claim 5, wherein the profiles include a concave axicon profile and said second aperture lies in the center of an optical component having a concave axicon profile.

7. The method of claim 5, wherein the profiles include flat optical elements oriented at an angle with respect to the particle beam trajectory with said second aperture oriented to permit unobstructed passage of the particle beam.

8. The method of claim 1 wherein step c) includes separating the apertures of the first and second optical elements by a distance of separation L which is of order $\lambda/(\theta_1^2+\gamma^{-2})$, where $\lambda$ is the laser wavelength, $\theta_1$ is the angle of intersection between the laser beam and the particle beam, and $\gamma$ is the relativistic energy factor equal to the total energy of the particle beam divided by the rest mass energy of the particle.

9. The method of claim 1 wherein step d) further includes causing the angle of intersection $\theta_1$ of the laser beam with respect to the particle beam to be of order $[(2n+1)\lambda/L]^{1/2}$, where n is an integer.

10. The method of claim 1 wherein step a) further includes causing the aperture of the first optical element to have a radius $r_a$ on the order of $\lambda/2\pi\theta_1$.

11. The method of claim 1 wherein step b) further includes causing the aperture of the second optical element to have a radius $r_b$ on the order of $\lambda/2\pi\theta_1$.

12. The method of claim 1 wherein the laser beam is polarized and the diffraction radiation is polarized, the polarization of the laser beam matching the polarization of the diffraction radiation and including radial and linear polarization, the polarization of the diffraction radiation depending upon the shape of the aperture.

13. The method of claim 1, further comprising the step of g) repeating the steps a)–f) in order to provide multiple stages as defined in steps a)–f), said stages being positioned in tandem so that said particle beam traverses serially through each stage.

14. The method of claim 13, further comprising the step of:

h) passing said laser beam through an optical element after passing through one stage of the multiple stages onto the succeeding stage.

15. The method of claim 13, further comprising the step of:

i) adjusting the phase of said laser beam relative to said particle beam.

16. An apparatus for exchanging energy between a relativistic particle beam containing one or more charged particles and a laser beam, the exchange of energy occurring due to inverse diffraction radiation, the apparatus comprising:

a first optical element having an aperture;

a second optical element having an aperture, the apertures of the first and second optical elements being separated by a predetermined distance of separation, L, and being positioned so that the relativistic particle beam passes through the aperture in the first optical element and then through the aperture in the second optical element, said laser beam interacting with said first element so that said laser beam intersects the particle beam at a predetermined angle, $\theta_1$, between the first and second elements, said laser beam interacting with the particle beam to exchange energy between said laser beam and the particle beam, wherein a net exchange of energy occurs because the interaction region is limited by the first and second optical elements, to produce inverse diffraction radiation, and said laser beam interacting with said second element after interacting with said particle beam.

17. The apparatus of claim 16 wherein the first optical element includes reflective and transmissive optics, at least some of the optical components having profiles that focus the laser beam onto the particle beam.

18. The apparatus of claim 17, wherein the profiles include a concave axicon profile and said first aperture lies in the center of an optical component having a concave axicon profile.

19. The apparatus of claim 17, wherein the profiles include a concave spherical profile and said first aperture lies in the center of an optical component having a spherical component.

20. The apparatus of claim 16 wherein the second optical element further includes optical components including reflective and transmissive optics, at least some of the optical components having profiles that direct the laser beam away from the particle beam after intersecting the particle beam.

21. The apparatus of claim 20, wherein the profiles include a concave axicon profile and said second aperture lies in the center of an optical component having a concave axicon profile.

22. The apparatus of claim 20, wherein the profiles include flat optical elements oriented at an angle with respect to the particle beam trajectory with said second aperture oriented to permit unobstructed passage of the particle beam.

23. The apparatus of claim 16 wherein the apertures of the first and second optical elements are separated by a distance, L, which is of order $\lambda/(\theta_1^2+\gamma^{-2})$, where $\lambda$ is the laser wavelength, $\theta_1$ is the angle of intersection between the laser beam and the particle beam, and $\gamma$ is the relativistic energy factor equal to the total energy of the particle beam divided by the rest mass energy of the particle.

24. The apparatus of claim 16 wherein the angle of intersection $\theta_1$ of the laser beam with respect to the particle beam is of order $[(2n+1)\lambda/L]^{1/2}$, where n is an integer.

25. The apparatus of claim 16 wherein the aperture of the first optical element has a radius $r_a$ on the order of $\lambda/2\pi\theta_1$.

26. The apparatus of claim 16 wherein the aperture of the second optical element to have a radius $r_b$ on the order of $\lambda/\pi\theta_1$.

27. The apparatus of claim 16 wherein the laser beam is polarized and the diffraction radiation is polarized, the polarization of the laser beam matching the polarization of the diffraction radiation and including radial and linear polarization, the polarization of the diffraction radiation depending upon the shape of the aperture.

28. The apparatus of claim 16, wherein the apparatus includes multiple stages, each stage including a distinct first optical element and a distinct second optical element, said stages being positioned in tandem so that said particle beam traverses serially through the stages.

29. The apparatus of claim 28, further comprising an optical element positioned so that said laser passes through the optical element after passing through one stage of the multiple stages onto the succeeding stage.

30. The apparatus of claim 28, further comprising a phase adjuster to adjust the phase of said laser beam relative to said particle beam.

31. An apparatus for exchanging energy between a relativistic particle beam, containing one or more charged particles, and a laser beam, the exchange of energy occurring due to inverse diffraction radiation, the apparatus comprising:

a first optical element having an aperture;

a second optical element having an aperture;

means for positioning the first and second optical elements so that the relativistic particle beam passes through the aperture in the first optical element and then through the aperture in the second optical element, the apertures of the first and second optical elements being separated by a predetermined distance of separation, L;

means for causing said laser beam to interact with said first element so that said laser beam intersects the particle beam at a predetermined angle, $\theta_1$, between the first and second elements;

means for causing energy to exchange between said laser beam and the particle beam, wherein a net exchange of energy occurs because the interaction region is limited by the first and second optical elements, to produce inverse diffraction radiation; and means for causing the laser beam to interact with said second element after interacting with said particle beam.

* * * * *